(12) United States Patent
Heissenstein et al.

(10) Patent No.: US 10,761,039 B2
(45) Date of Patent: Sep. 1, 2020

(54) METHOD FOR EXAMINATION OF A SAMPLE BY MEANS OF THE LOCK-IN THERMOGRAPHY

(71) Applicant: DCG Systems GmbH, Erlangen (DE)

(72) Inventors: Hans Heissenstein, Wiesenttal (DE); Peter Stolz, Fürth (DE); Raiko Meinhardt-Wildegger, Erlangen (DE)

(73) Assignee: DCG Systems GmbH, Erlangen (DE)

( * ) Notice: Subject to any disclaimer, the term of this patent is extended or adjusted under 35 U.S.C. 154(b) by 0 days.

(21) Appl. No.: 14/730,186

(22) Filed: Jun. 3, 2015

(65) Prior Publication Data

US 2015/0355118 A1 Dec. 10, 2015

(30) Foreign Application Priority Data

Jun. 4, 2014 (EP) .................................... 14171140
Aug. 14, 2014 (EP) .................................... 14181006

(51) Int. Cl.
*G01J 1/04* (2006.01)
*G01N 25/00* (2006.01)
*G01J 5/00* (2006.01)
*G01N 25/72* (2006.01)

(52) U.S. Cl.
CPC ............... *G01N 25/00* (2013.01); *G01J 5/00* (2013.01); *G01N 25/72* (2013.01); *G01J 2005/0077* (2013.01)

(58) Field of Classification Search
CPC . G01N 25/72; G01N 21/35; G01J 3/42; G01J 5/34; G01J 2005/0077
See application file for complete search history.

(56) References Cited

U.S. PATENT DOCUMENTS

| 4,968,144 | A | * | 11/1990 | Thomas | .................... | G01H 9/00 |
| | | | | | | 356/432 |
| 9,025,020 | B2 | * | 5/2015 | Deslandes | .............. | G01N 25/72 |
| | | | | | | 348/92 |
| 2005/0056786 | A1 | | 3/2005 | Shephard et al. | | |
| 2011/0297829 | A1 | * | 12/2011 | Altmann | .................. | G01N 1/00 |
| | | | | | | 250/332 |
| 2014/0328370 | A1 | * | 11/2014 | Lang | ...................... | G01N 25/72 |
| | | | | | | 374/124 |

FOREIGN PATENT DOCUMENTS

| EP | 2952884 A1 | 12/2015 |
| WO | 01/29545 A1 | 4/2001 |
| WO | 2013/083846 A1 | 6/2013 |

OTHER PUBLICATIONS

Schlangen et al. "Dynamic lock-in thermography for operation mode-dependent thermally active fault localization" Elsevier, Microelectronics Reliability 50 (2010) 1454-1458.*

(Continued)

*Primary Examiner* — David P Porta
*Assistant Examiner* — Mamadou Faye
(74) *Attorney, Agent, or Firm* — Klarquist Sparkman, LLP

(57) ABSTRACT

Method for a non-destructive and image forming examination of a sample (1) by means of a heat flow thermography method where the examination consists of evaluating the presence of any gradients in heat flow velocity at respective depth distances from a surface of the sample (1), comprising exciting the sample (1) by means of periodic heat pulses P1 from at least one excitation source, and capturing thermal image sequences of a thermal flow originating from the heat pulses by at least one infrared camera (5), implementing relative time delays Δt between a starting point of imaging of the respective image sequences and a starting point of the periodic excitation, combining all captured image sequences to a resulting image sequence in which all images are (Continued)

Figure 1:
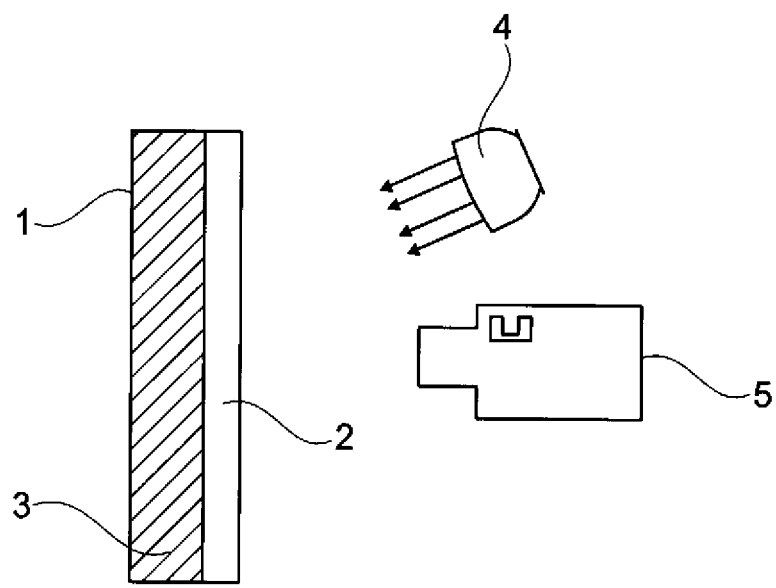

arranged in a correct time sequence, and extracting from the resulting image sequence an indication of the existence and depth distance of a heat flow velocity transition from a surface of the sample. Exciting the sample (1) comprises applying heat pulses to the sample with a lock-in frequency equal to or higher than one fourth of the imaging frequency of the camera for exciting the sample (1), controlling an excitation period of the heat pulses during which the excitation of the sample (1) by means of the heat pulses takes place, and capturing thermal image sequences comprises capturing the plural image sequences during successive excitation periods of the heat pulses with the imaging frequency. The invention includes also a system for implementing the above method.

12 Claims, 11 Drawing Sheets

(56) References Cited

OTHER PUBLICATIONS

Breitenstein et al. "Lock-in Thermography, Basics and Use for Evaluating Electronic Devices and Materials, 2010, Springer, 2nd Ed. p. 26-27".*

Breitenstein et al. (1) "New Developments in IR Lock-in Thermography" ISTFA 2004: Proceeding of the 30th International Symposium for Testing and Failure Analysis, ProQuest, 2004, p. 1-5.*
Breitenstein et al. (1) "Basics and Use for Evaluating Electronic Devices and Materials" Springer, 2010, p. 7-59.*
Blanchot, L., et al., "Low-coherence in depth microscopy for biological tissues imaging: design of a real time control system," Proc. SPIE, vol. 3194, Photon Propagation in Tissues III, Jan. 1998, pp. 198-204.
Carslaw, H.S., et al., "Conduction of Heat in Solids", 2nd Edition, Oxford University Press, 1959, pp. 297-326.
Huth, S., et al., "Lock-in IR-Thermography—a novel tool for material and device characterization," Solid State Phenomena, vols. 82-84, Jan. 2002, pp. 741-746.
Maldague, X., "Active Thermography," Theory and Practice of Infrared Technology for Nondestructive Testing, Wiley, John & Sons, Incorporated, Chapter 9, Apr. 2001, pp. 343-365.
Schmidt, C. et al., "Non-Destructive Defect Depth Determination at Fully Packaged and Stacked Die Devices Using Lock-in Thermography", Physical and Failure Analysis of Integrated Circuits (IPFA), 2010, 17th IEEE International Symposium, IEEE, Piscataway, NJ, USA, Jul. 5, 2010, pp. 1-5.
Wolf, A., et al., "Thermophysical analysis of thin films by lock-in thermography," Journal of Applied Physics, vol. 96, No. 11, Jan. 2004, pp. 6306-6312.
Extended Search Report for European Patent Application No. 14181006.9 dated Oct. 20, 2015.

* cited by examiner

METHOD FOR EXAMINATION OF A SAMPLE BY MEANS OF THE LOCK-IN THERMOGRAPHY

RELATED APPLICATIONS

This Application claims priority benefit from European Patent Application No. 14171140.8, filed on Jun. 4, 2014, and European Patent Application No. 14181006.9, filed on Aug. 14, 2014, the disclosures of which are incorporated herein by reference in their entireties.

BACKGROUND

The invention relates to a method for a non-destructive and image forming examination of a sample for defects by means of lock-in thermography.

The heat flow thermography has been established in the past years as a non-contacting and nondestructive examination method. According to this method, a sample is excited by at least one source in order to generate a heat flow. The heat radiation immediate from the sample is captured by at least one infrared sensor in a sequence of images, and is passed on to a calculating unit. Resulting images of various types can be generated in the computing unit whereby a thermal image or an amplitude- or phase image, respectively is retrieved (Theory and Practice of Infrared Technology for Nondestructive Testing, Xavier P. V. Maldague-John Wiley & Sons, Incl., 2001).

The WO 2013/083846 A1 discloses a method for a non-destructive, non-contacting and image forming examination of a sample by means of the heat flow thermography method using individual excitation pulses for evaluating an existence and/or depth distance values of any heat flow velocity transitions below a surface of the sample, wherein the sample is excited by heat pulses of at least one excitation source, and a thermal flow originating therefrom is captured by at least one infrared sensor in an image sequence of thermal images, and wherein the thermal images obtained from the image sequence are evaluated by means of a signal and image processing and depicting a thermal flow with a resolution in time and in space. The method comprises exciting the sample at least twice independently from each other by means of the heat pulses from the excitation source where a second excitation and any succeeding excitation is delayed with respect to a preceding excitation by a time delay whereby the start of the captured sequence happens at another defined point of time within the time between two images within an image sequence; detecting the respective total thermal flow processes generated by the at least two excitation processes of the sample by the infrared sensor in the independent image sequences containing the excitation as well as the thermal response signal from the sample, combining all captured image sequences to a total image sequence in which all images are arranged in a sequence which is correct in time with respect to the point of time of the pulse like excitation, and extracting from the total image sequence an indication of the depth distance of a heat flow velocity transition from a surface of the sample. Therein, the heat flow velocity transitions can be defects below a surface of a work piece or boarders between layers in a layered material.

The resulting image sequences resulting from compilation of the individual image sequences are processed as disclosed in WO 2013/083846 A1. As long as the respective intensity values of the captured image sequences are not corrected they show an increased resolution in time of the evaluated pixel related functions of the surface intensity, but they form pixel related intensity curves of the total sequence which do not comprise a strictly monotonous behavior in the areas to be evaluated. Therefore, they cannot be processed mathematically in an unambiguous way. After the correction following a typical correction method in IR-imaging technique the first image sequence serves as a reference sequence in this example, all captured image sequences are subject to the same intensity offset. Therefore, all respective combined pixel related intensity curves in the areas to be evaluated (after the excitation) are to be strictly monotonous up to small mistakes in correction based on the imperfection of the used model.

The total image sequences are used for the reconstruction of the total layer structure of the sample in case of a layered (material) starting from the physical model thereof as well as from the known excitation signal of the excitation source. For this purpose, pulse responses of the total system for different run times of appropriate length are calculated beforehand from the physical model of sample to be examined, for example by means of the inverse Laplace transformation ("Conduction of Heat in Solids, $2^{nd}$ Edition, Carslaw H. S. and Jaeger J. C., Clearendon Press Oxford, 1959, pages 297 to 326). Therefrom, the respective thermal response signals of the layered material are equalized mathematically for example with the method of the least squares (Taschenbuch der Mathematik, I. N. Bronstein, K. A. Semendjajew, $25^{th}$ edition, B. G. Teubner Verlagsgesellschaft, Stuttgart, Leipzig and Verlag Nauka, Moskau, 1991).

Thereby, the optimal upper and base run time parameters can be extracted out of the respective areas of the intensity curves of the resulting image sequence wherein the upper run time parameter is the run time parameter of the upper layer and the base run time parameter is the run time parameter of the base layer of the two layer material. Subsequently, the respective layer thickness values of the layered material to be examined are calculated while using previous knowledge of the diffusivity values according to the known evaluation method (Theory and Practice of Infrared 5 Technology for Non-destructive Testing, Xavier P. V. Maldague, John Wiley & Sons, Inc., 2001, pages 527-536). These values are, thereafter, combined to an image which covers the complete area.

In the paper of CHRISTIAN SCHMIDT et al: "Non-destructive defect depth determination at fully packaged and stacked die devices using Lock-in Thermography", PHYSICAL AND FAILURE ANALYSIS OF INTEGRATED CIRCUITS (IPFA, 2010), proceedings 17th IEEE International Symposium on the IEEE, NJ, USA, Jul. 5, 2010 (2010-07-05), pages 1 to 5, XP 031720074, ISBN 978-1-4244-5596-6, a non-destructive approach for the 3D localization of thermally active buried defects in single chip and stacked die architectures by use of lock-in thermography (LIT) is presented. The paper also explains the method how to process the time resolved result curves to obtain the frequency vs. phase shift curves from which the depth location of the thermally active buried defects is derived. The basic principal concerns the thermal wave propagation through different material layers and the resulting phase shift. Based on that, the LIT application for 3D defect localization is explained and both fully packaged single chip and stacked die devices are considered while comparing the theoretical and experimental data (results). In the lock-in thermography, a periodic excitation signal is applied to the sample, and the camera scans the respective area of the sample surface with a high frequency such that each signal can be correlated in time to the excitation paste on the images taken by the camera. A parasitic heating up and other signals outside of the excitation frequency are suppressed.

Wolf A. et al.: "Thermophysical analysis of thin films by lock-in thermography", Journal of applied physics, American Institute of Physics, New York, US, vol. 96, no. 11, 1 Jan. 2004 82004-01-01), pages 6306-6312, XP01068299, ISSN: 0021-8979, DOI: 10.1063/1.1811390, disclose a method for the determination of the thermophysical properties of thin films. The procedure is based on the contact-free thermal analysis of free standing thin films by means of a lock-in thermography system. The thermophysical properties are deduced from the thermal diffusion length and the temperature amplitude of a thermal wave propagating in the sample excited by a laser heat source. An infrared camera images the wave and the thermal diffusion length $\Lambda_\alpha$ of the amplitude and the thermal diffusion length $\Lambda_\rho$ of the phase are measured. Thermal losses influence both $\Lambda_\alpha$ and $\Lambda_\rho$. Their geometric mean $\Lambda_\alpha \Lambda_\rho$ is, however, not effected by thermal losses. In turn $1/\Lambda_\alpha^2 - 1/\Lambda_\rho^2$ is determined by the thermal losses and does not depend on the lock-in frequencies, as $\Lambda_\alpha$ and $\Lambda_\rho$ yield the in-plane thermal diffusivity and a damping factor. The latter quantifies the thermal losses to the ambient. The use of a vacuum chamber and a temperature calibration are not required. If, however, the camera is calibrated, the in-plane thermal conductivity and the volumetric heat capacity are obtained from the temperature amplitude of the thermal wave. The measurement accuracy is 10% for the thermal diffusivity, thermal conductivity, and volumetric specific heat. The thermophysical properties measured for thin films of copper, nickel, silver, and polyimide agree with literature values.

In the lock-in thermography, a maximum geometrical resolution may be obtained by means of high resolution cameras and respective objective lenses, respectively, almost arbitrarily. However, the maximum time resolution of measurement system for a heat flow thermography method is restricted by the camera system. The image repetition rates or imaging frequencies achievable by detector matrices of modern cameras when using all presently available decoder elements (full image mode) are 100 images per second. This is not sufficient in order to resolve the thermal response signals of defects near the surface of a sample out of thermally fast materials. For example, in the technical field of the metal industry as well as in the electronic industry there is a tendency to use lock-in thermography for product inspection during production to ensure quality control. Since state of the art cameras have an imaging frequency of 100 Hz, the lock-in frequencies are restricted to a maximum of 25 Hz (from Nyquist-Shannon sampling theorem). For higher frequencies, the image area and, thereby, also the resolution of the images has to be restricted. On the other hand, a lock-in frequency in this order of magnitude is insufficient to examine work pieces having defects near the surface thereof or layered structures with high heat conductivity characteristics.

Starting from the above state of the art, it is the object of the invention to provide a method and system for a non-destructive, non-contacting and image forming examination of a sample by means of the heat flow thermography method where the examination consists of evaluation a depth distance values of any heat flow velocity transitions which can be defects below a surface of a work piece or boarders between layers in a layered material, with high time and local resolution wherein the thermal material parameters may flexibly, quickly and robustly be reconstructed/examined within a short measurement time.

For this purpose, the method of the invention for a non-destructive, non-contacting and image forming examination of a sample by means of a heat flow thermography method where the examination consists of evaluating the presence of any gradients in heat flow velocity at respective depth distances from a surface of the sample, comprising exciting the sample by means of periodic heat pulses from at least one excitation source, and capturing thermal image sequences of a thermal flow originating from the heat pulses by at least one infrared camera, implementing relative time delays $\Delta t$ between a starting point of imaging of the respective image sequences and a starting point of the periodic excitation, combining all captured image sequences to a total image sequence in which all images are arranged in a correct time sequence, and extracting from the total image sequence an indication of the existence and depth distance of a heat flow velocity transition from a surface of the sample, is characterized by exciting the sample comprises applying heat pulses to the sample with a lock-in frequency, controlling an excitation period of the heat pulses during which the excitation of the sample by means of the heat pulses takes place, and capturing thermal image sequences by capturing the plural image sequences during successive excitation periods of the heat pulses with the imaging frequency.

By means of various embodiments of the invention, the problem related to the restricted lock-in frequency based on the image repetition rate of the camera is solved by using a combination of the lock-in frequency technology with implementing relative time delays $\Delta t$ between a starting point of imaging of the respective image sequences and a starting point of the periodic excitation and combining all images of the captured image sequences to a resulting image sequence which has a virtual resulting frequency of the camera frequency, i.e. 100 Hz, multiplied by the number of sequences combined. Therein, it is necessary to control excitation periods of the heat pulses to start and stop, respectively, the excitation of the sample by means of the excitation pulses define the Lock-in frequency so that there is a well-defined starting point and end point of a measurement (lock-in) period and a heating-up of the sample with a fixed frequency correlation to the camera frequency is ensured.

According to one embodiment of the method of the invention, the lock-in frequency is equal to or higher than one fourth of the imaging frequency of the camera. According to another embodiment of the method of the invention, the lock-in frequency is higher than the imaging frequency of the camera. It is a specific advantage of the invention that the lock-in frequency can be selected in this way which allows the lock-in frequency to be adapted to specific applications considering the heat conductivity of the sample, i.e. the heat conductivity of the layers in case of a layered material or the heat conductivity of a work piece in case of defects in a work piece. This allows the lock-in frequency to be selected according to the depth of the gradients in heat flow velocity in the sample where the lock-in frequency is selected to be the higher the closest to the surface the gradients in heat flow velocity to be detected, are located.

According to another embodiment of the method of the invention, the excitation periods of the heat pulses extend across at least one period of the lock-in frequency. By selecting the excitation period in this way, it is ensured that the effect of the virtual imaging frequency can be fully obtained and, on the other hand, the excitation period can be selected to reflect a shorter or longer measurement period in relation to the heat flow characteristics of the sample, in particular in relation to the heat conduction within the sample.

According to another preferred embodiment of the method of the invention, off-periods of the heat pulses between the excitation periods extend up to a point of time when an equilibrium condition is reached with respect to the dissipation of the heat applied during the excitation period of the sample. This has the advantage that the sample is in a "cold" state prior to the commencement of the next measurement during the next excitation period.

According to another preferred embodiment of the method of the invention, the time delays $\Delta t$ between an image sequence and a subsequent image sequence with un-shifted lock-in pulses or between a first lock-in pulse and subsequent lock-in pulses of the lock-in frequency with un-shifted image sequences are carried out in equal time portions. This allows a uniform building up of the total image sequence which is used for reconstructing at least one layer of the total layer structure of the layered material.

Therein, the lengths of the time delays $\Delta t$ may be defined as the quotient of the time between two images within an image sequence divided by the number of the independently captured image sequences n. Thereby, the increase of the resolution in time of the examination is coupled proportionally to the number of the captured image sequences.

According to another preferred embodiment of the method of the invention, the lock-in frequency and the imaging frequency of the camera are synchronized to commence with the starting point in time of the excitation periods. This ensures that the virtual imaging frequency results after combining the individual image sequences, i.e. that the images after combination of the individual image sequences are spaced at equal time distances which facilitates processing and evaluation of the resulting image sequences.

To summarize, the evaluation of a total layer structure of a layered material can be achieved. The evaluation can be done by imaging which has high resolution in time as well as in space and is scalable with respect to both parameters. Thereby, a calibration free and quantitative reconstruction of the thermal material parameters can be made flexibly, quickly and robustly under industrial conditions.

By evaluating the image sequences in the manner described above, one can not only verify the existence of any pores or layer structures in the sample but also the depths location of the respective defects or transitions by correlating the time delay of their respective images from the excitation.

According to an embodiment of the invention, a system for a non-destructive, non-contacting and image forming examination of a sample by means of a heat flow thermography method where the examination consists of evaluating the presence of any gradients in heat flow velocity at respective depth distances from a surface of the sample, comprising an excitation source for exciting the sample by means of periodic heat pulses from at least one excitation source, and at least one infrared camera for capturing thermal image sequences of a thermal flow originating from the heat pulses, a control circuit configured to implement relative time delays $\Delta t$ between a starting point of imaging of the respective image sequences and a starting point of the periodic excitation, and to combine all captured image sequences to a total image sequence in which all images are arranged in a correct time sequence, and to extract from the total image sequence an indication of the existence and depth distance of a heat flow velocity transition from a surface of the sample, is characterized in that the control circuit is further configured to excite the sample by applying heat pulses to the sample with a lock-in frequency, to control an excitation period of the heat pulses during which the excitation of the sample by means of the heat pulses takes place, and capturing thermal image sequences by capturing the plural image sequences during successive excitation periods of the heat pulses with the imaging frequency.

The application of the method and the system of the invention to a structure of layered material is only one of many possible applications of the method of the invention. In case of a structure of layered material, the interface between one of the at least two layers and the adjacent layer forms a heat flow velocity transition between the heat flow velocity in one of the layers and the heat flow velocity in the other layer. Since there are two layers, the heat flow velocity by definition is different in the two layers. Therefore, the depth distance of this heat flow velocity transition can be determined by analyzing the thermal images taken during the cause of the excitation and the dissipation of the heat input into the sample.

According to another aspect of the method and system of the invention the sample comprises a work piece including defects close to a surface of the sample which defects are heat flow velocity transitions experienced by the heat flow from the surface of the sample into a body of the sample, wherein the indication of presence and depth distance of a particular defect is a hot spot in a respective image of the image sequence which respective image was taken at a time distance from the excitation of the sample related to the depth distance of the defect from the surface of the sample.

As is apparent from the above specification, the method of the invention is applicable in cases where a heat flow velocity transition in a sample is to be detected where the changes in time of the heat flow dissipation curve or the intensity curve emitted of an area of the sample over time in terms of discrete captured images varies so fast that a full range camera, for example a camera having 640×514 pixel full frame, cannot record the changes in the intensity in the image of the heat flow. In other words the method of the invention is applicable in cases where the imaging frequency of the camera, i.e. the number of frames that can be taken per second, is too slow to capture the changes of the intensity in the image of the heat flow. In such cases, the two or more image sequences can be interleaved in order to improve the time resolution of the recording of the heat flow accordingly.

Embodiments of the invention as well as further features, applications and advantages are explained with reference to the Figures.

FIG. 1 schematically shows a device for capturing the respective total heat flow processes in reflection of a layered material formed by an upper layer on a base layer as one application example of the invention.

Figure 2:
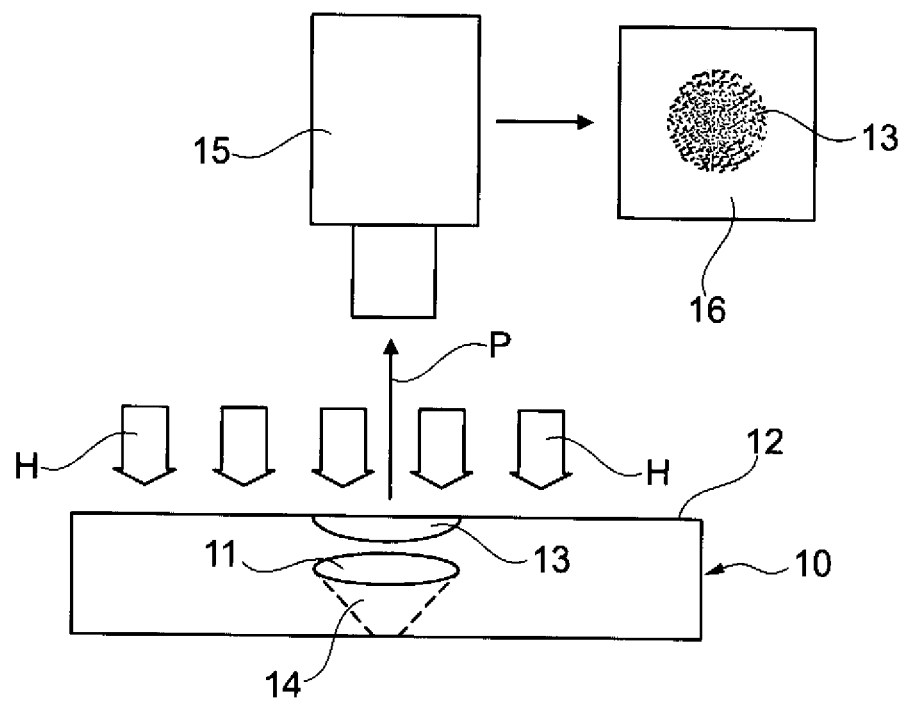

FIG. 2 schematically shows a device for capturing the respective total heat flow processes in reflection of a sample having defects as another application example of the method of the invention.

Figure 3:
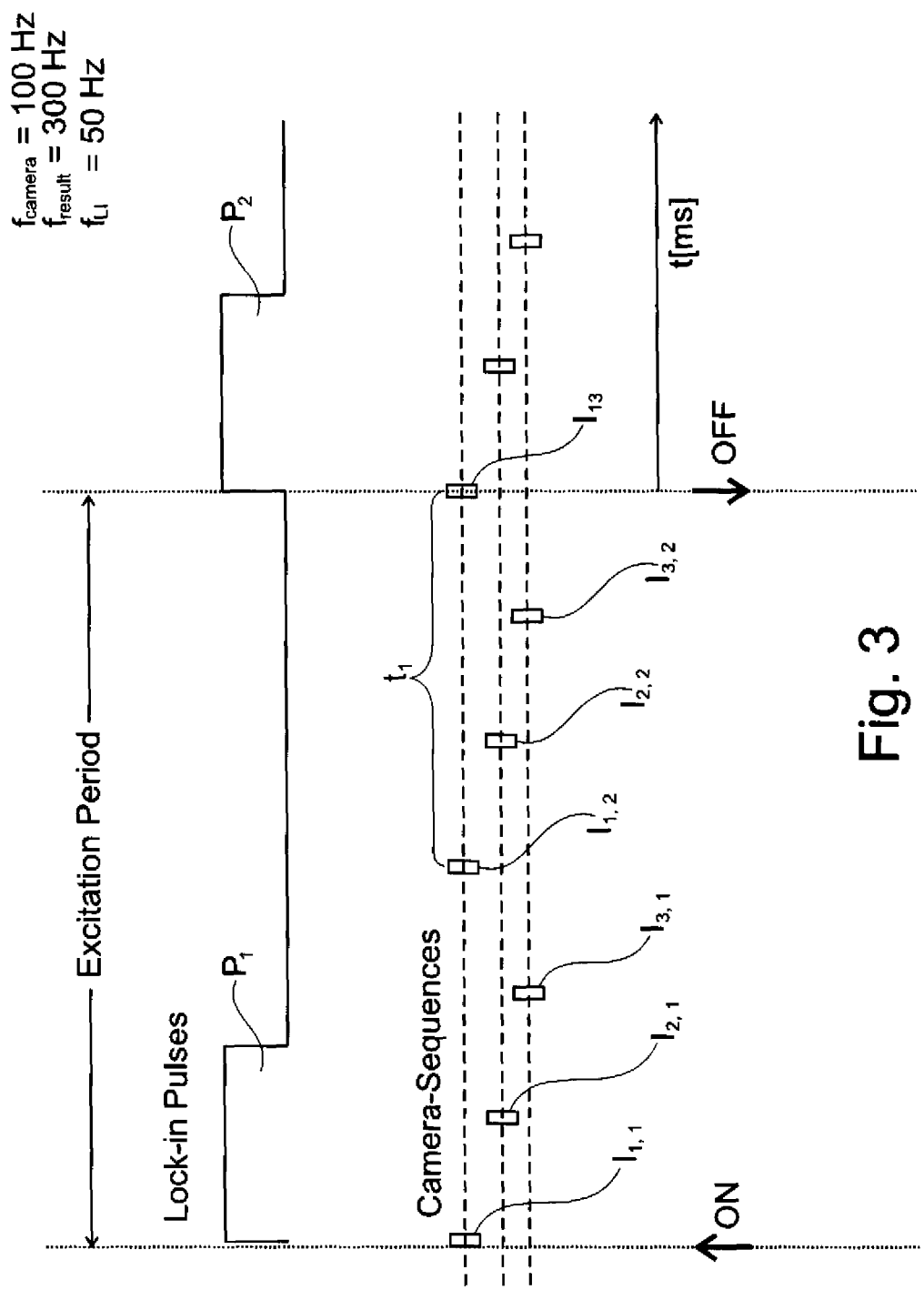

FIG. 3 schematically shows the timing of the capturing of three image sequences which have a delay of $\Delta t$ each to the previous image sequence with a lock-in frequency of 50 Hz.

Figure 4:
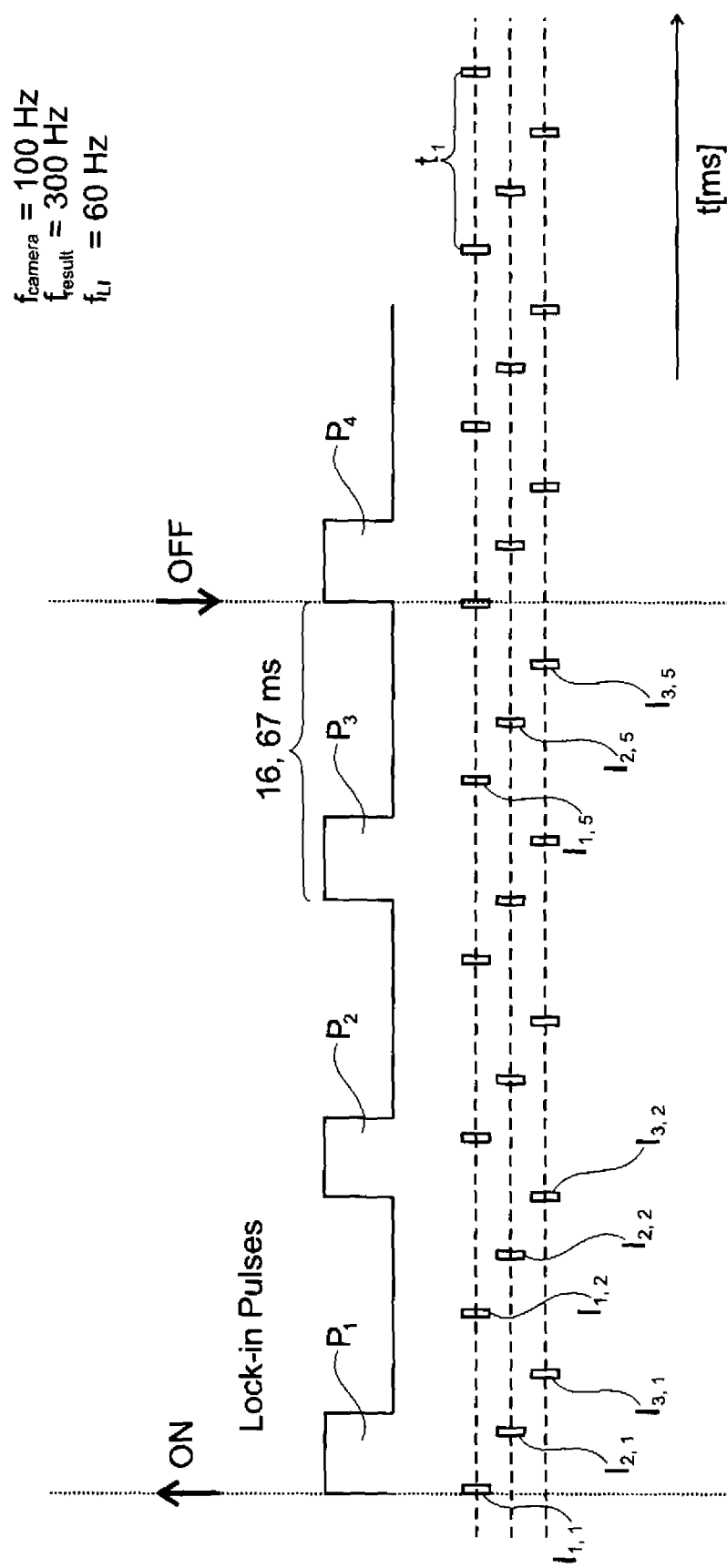

FIG. 4 schematically shows the timing of the capturing of three image sequences which have a delay of $\Delta t$ each to the previous image sequence with a lock-in frequency of 60 Hz.

Figure 5:
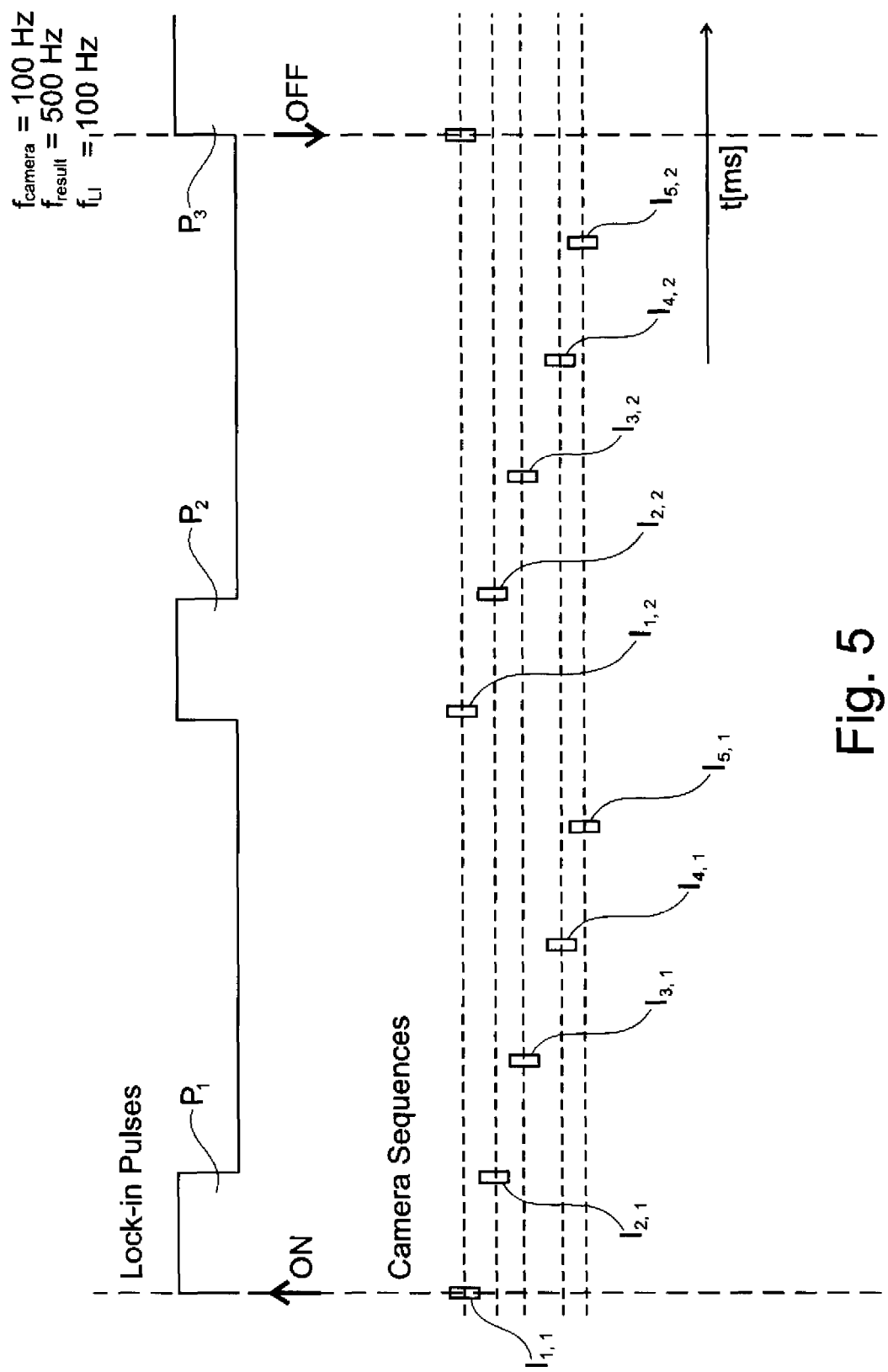

FIG. 5 schematically shows the timing of the capturing of five image sequences which have a delay of $\Delta t$ each to the previous image sequence with a lock-in frequency of 100 Hz.

Figure 6:
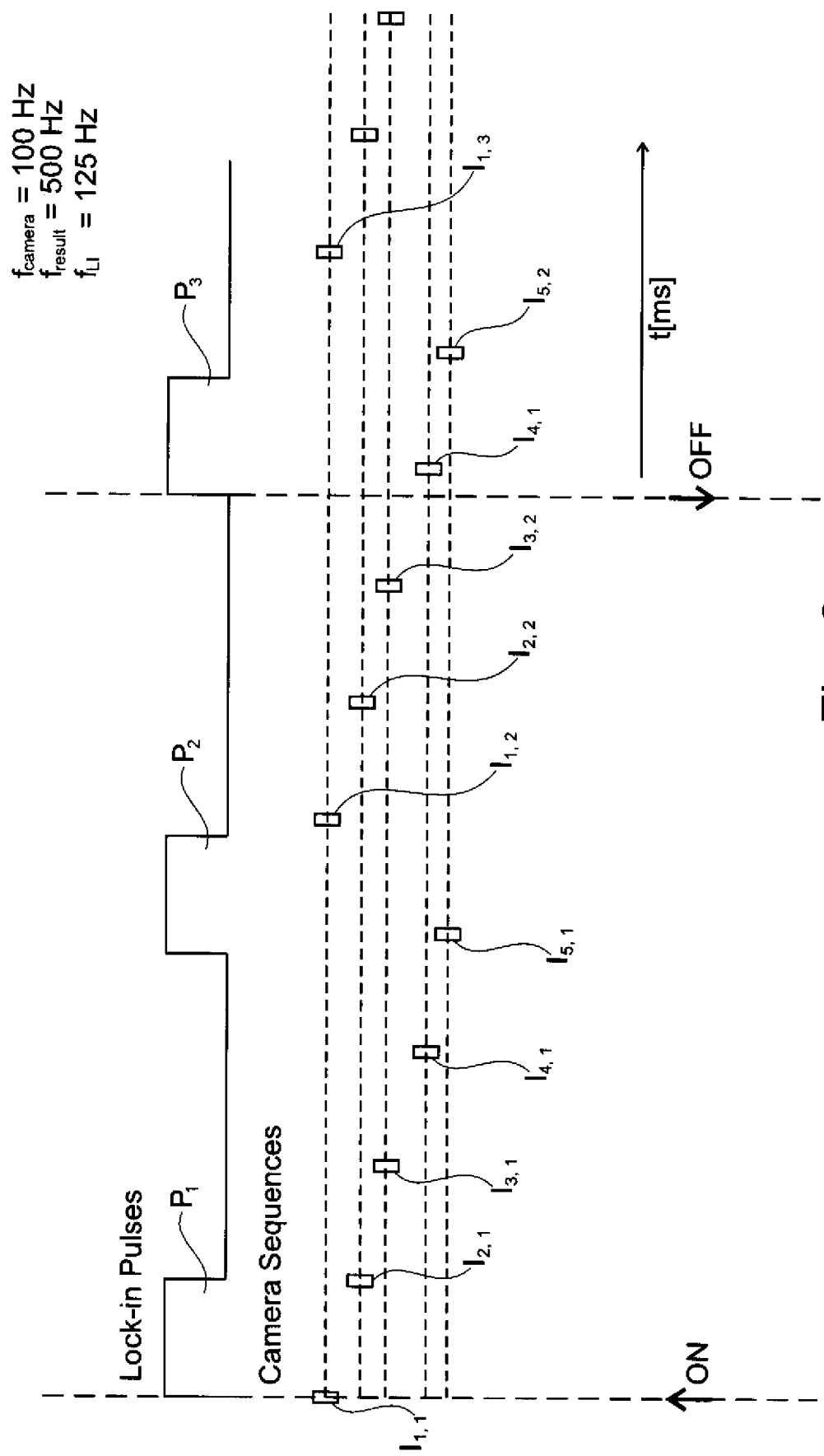

FIG. 6 schematically shows the timing of the capturing of five image sequences which have a delay of Δt each to the previous image sequence with a lock-in frequency of 125 Hz.

Figure 7:
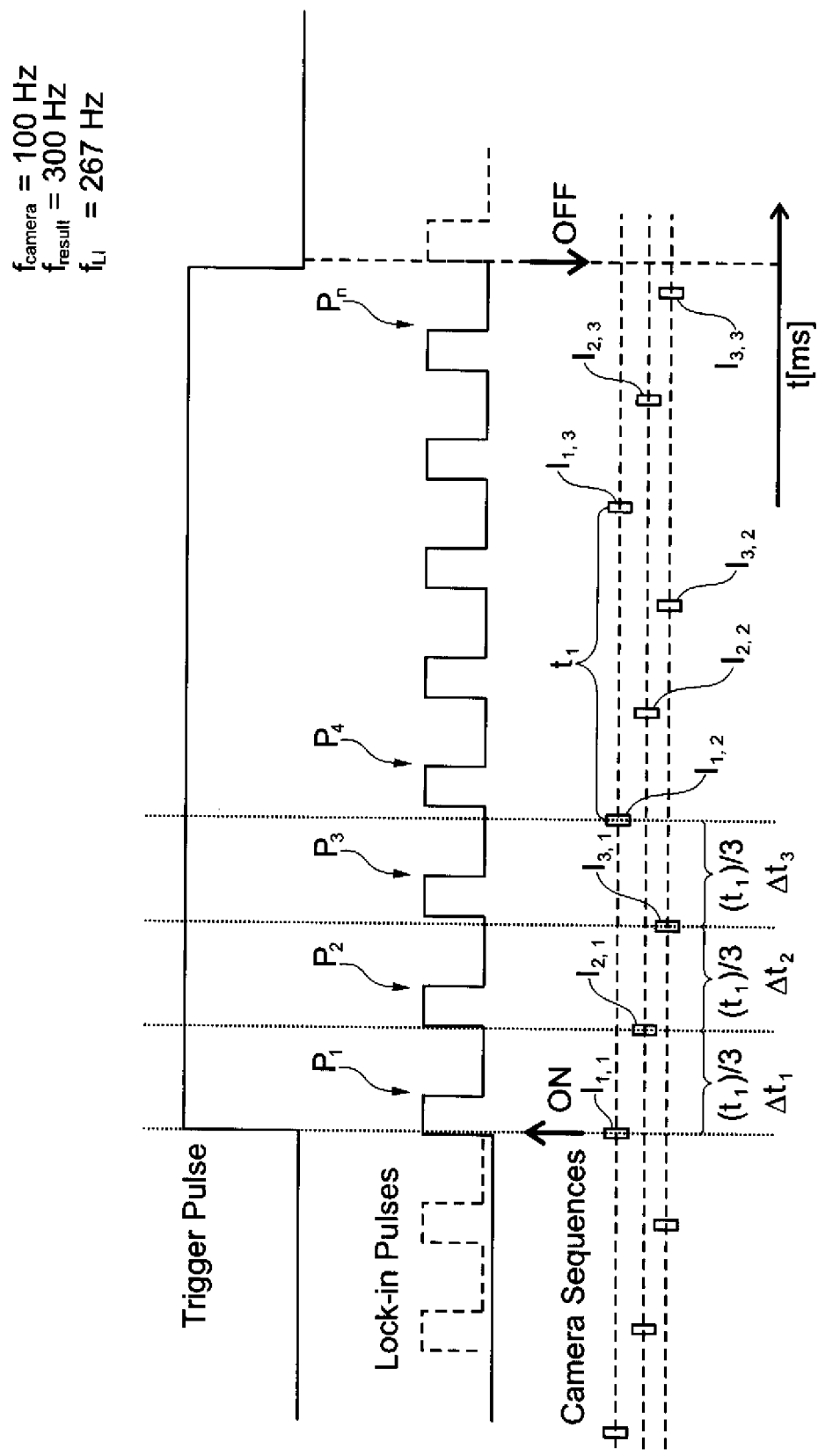

FIG. 7 schematically shows the timing of the capturing of three image sequences which have a delay of Δt each to the previous image sequence with a lock-in frequency of 100 Hz. Whereas the delay is the same one would get with five sequences to be captured.

Figure 8:
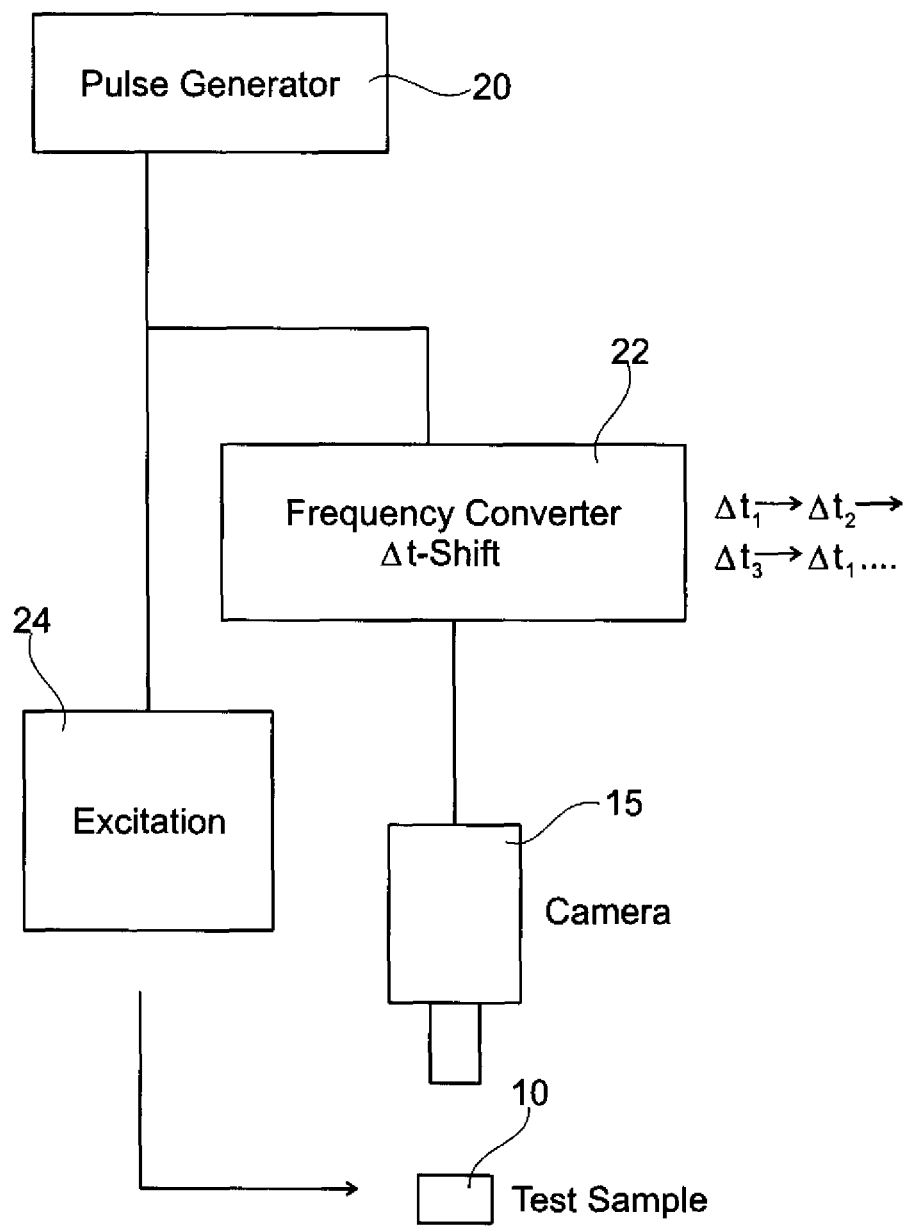

FIG. 8 schematically shows the timing of the capturing of three image sequences which have a delay of Δt each to the previous image sequence with a lock-in frequency of 267 Hz.

Figure 9:
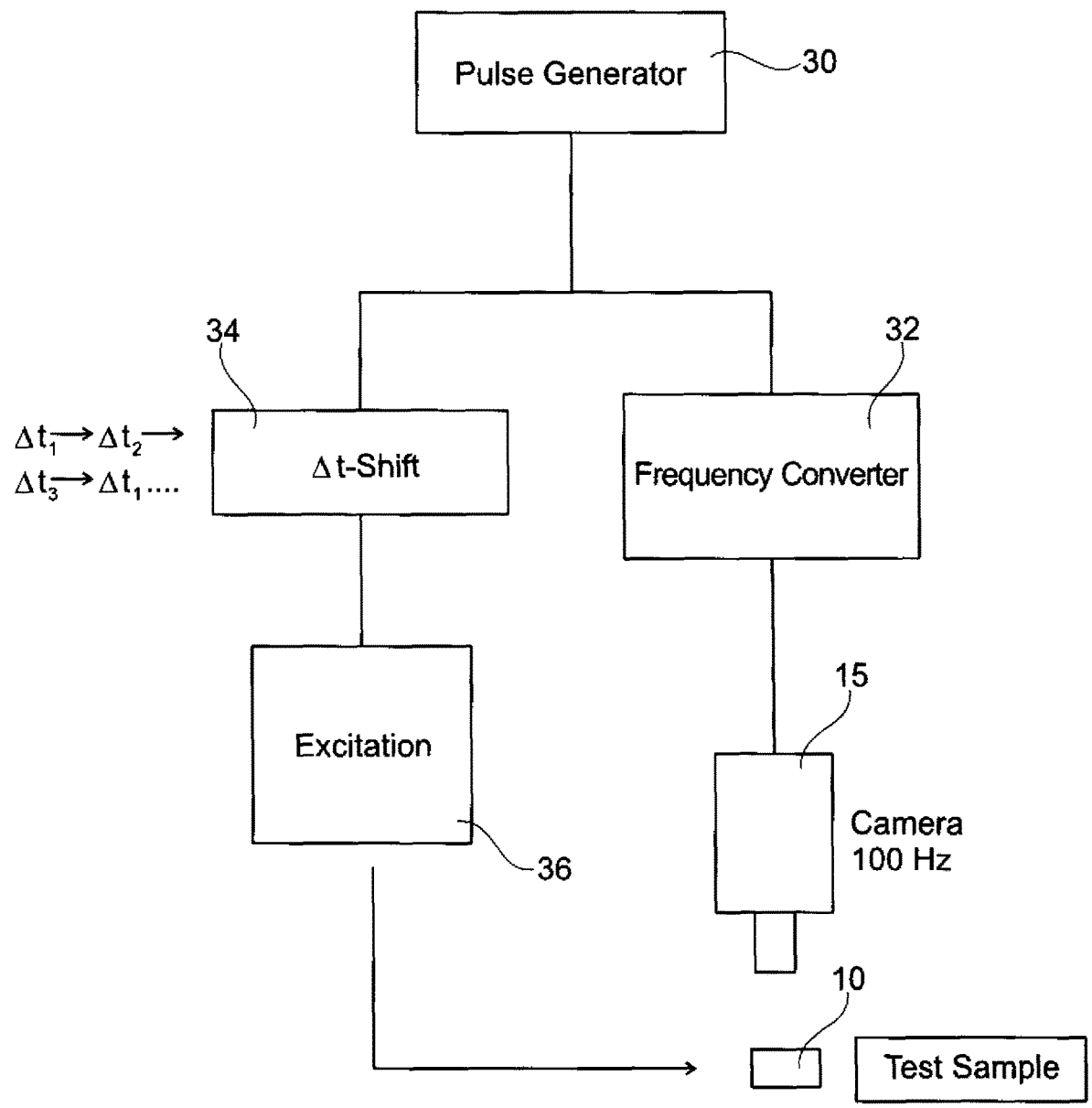

FIG. 9 schematically shows a block diagram of an embodiment of a system for implementing an embodiment of the method of the invention.

Figure 10:
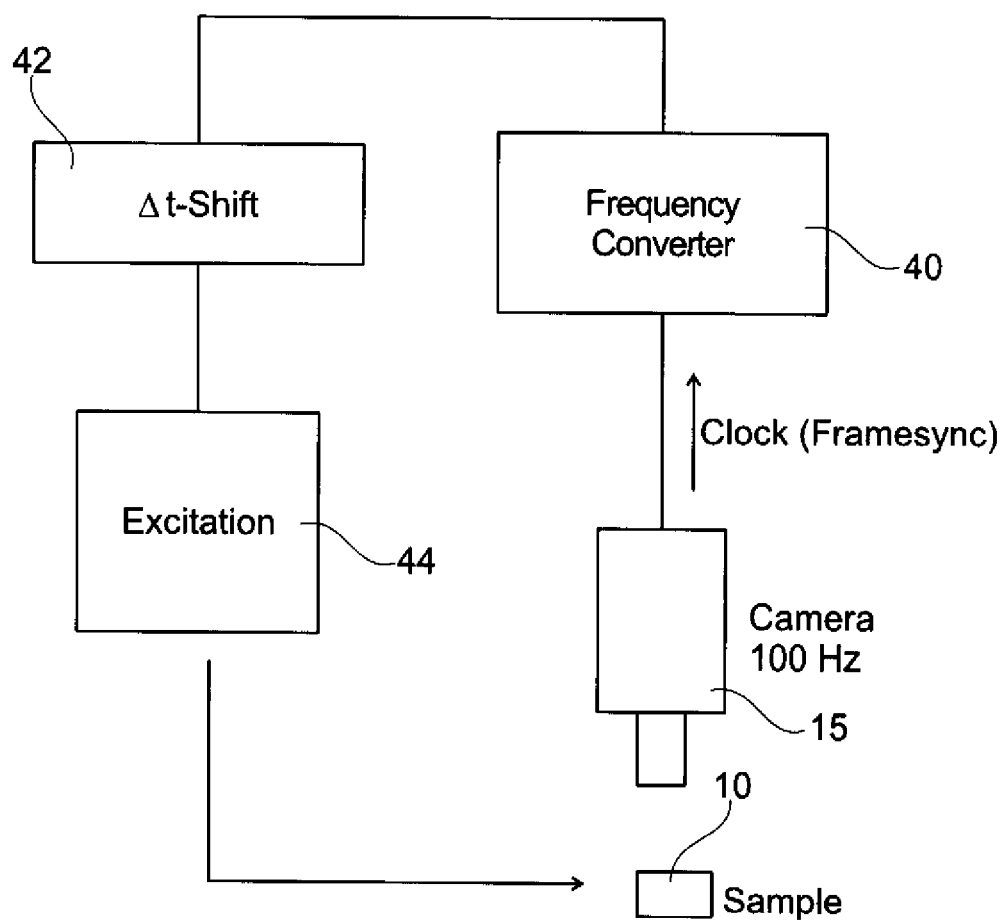

FIG. 10 schematically shows a block diagram of another embodiment of a system for implementing an embodiment of the method of the invention.

Figure 11:
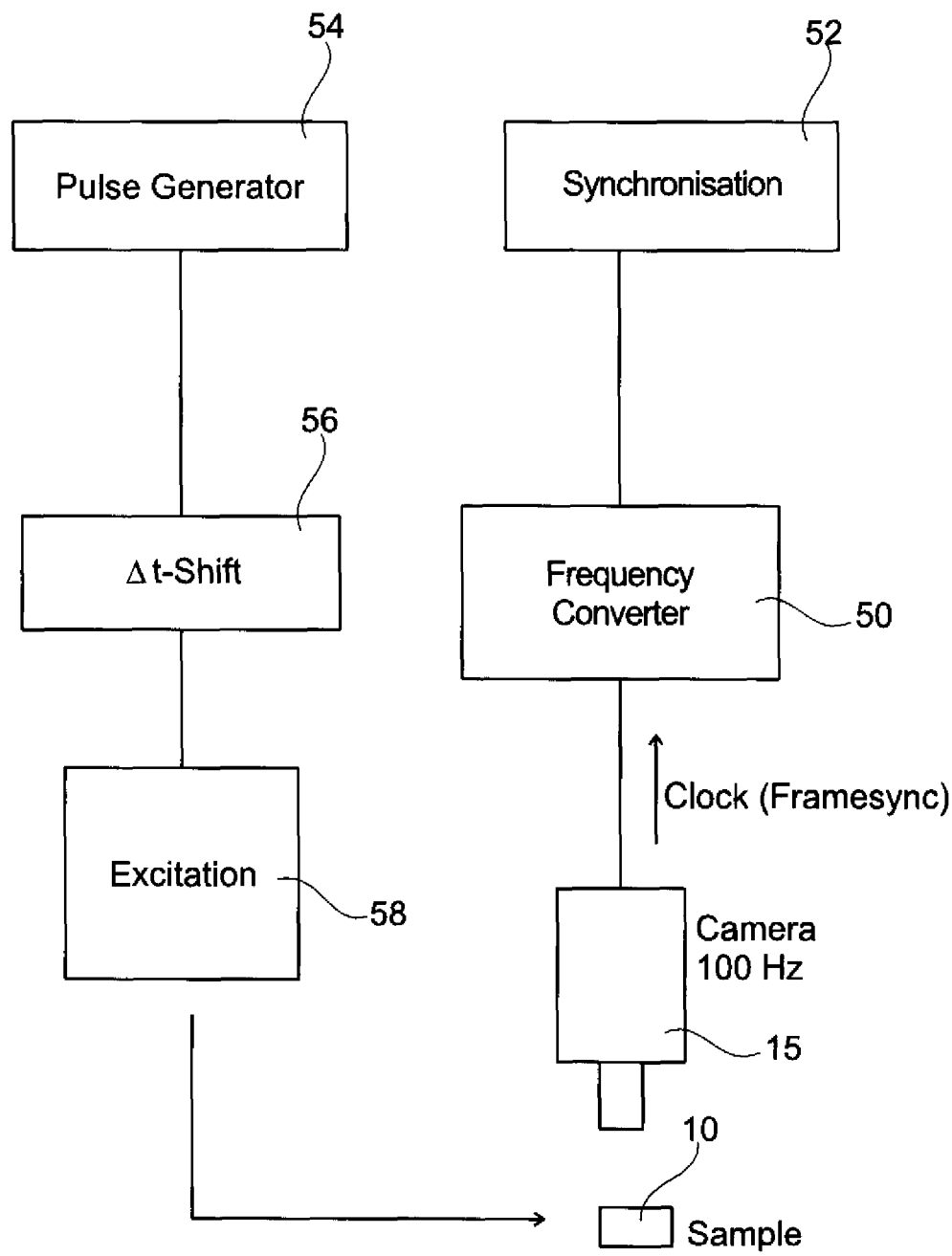

FIG. 11 schematically shows a block diagram of another embodiment of a system for implementing an embodiment of the method of the invention.

Figure 12:
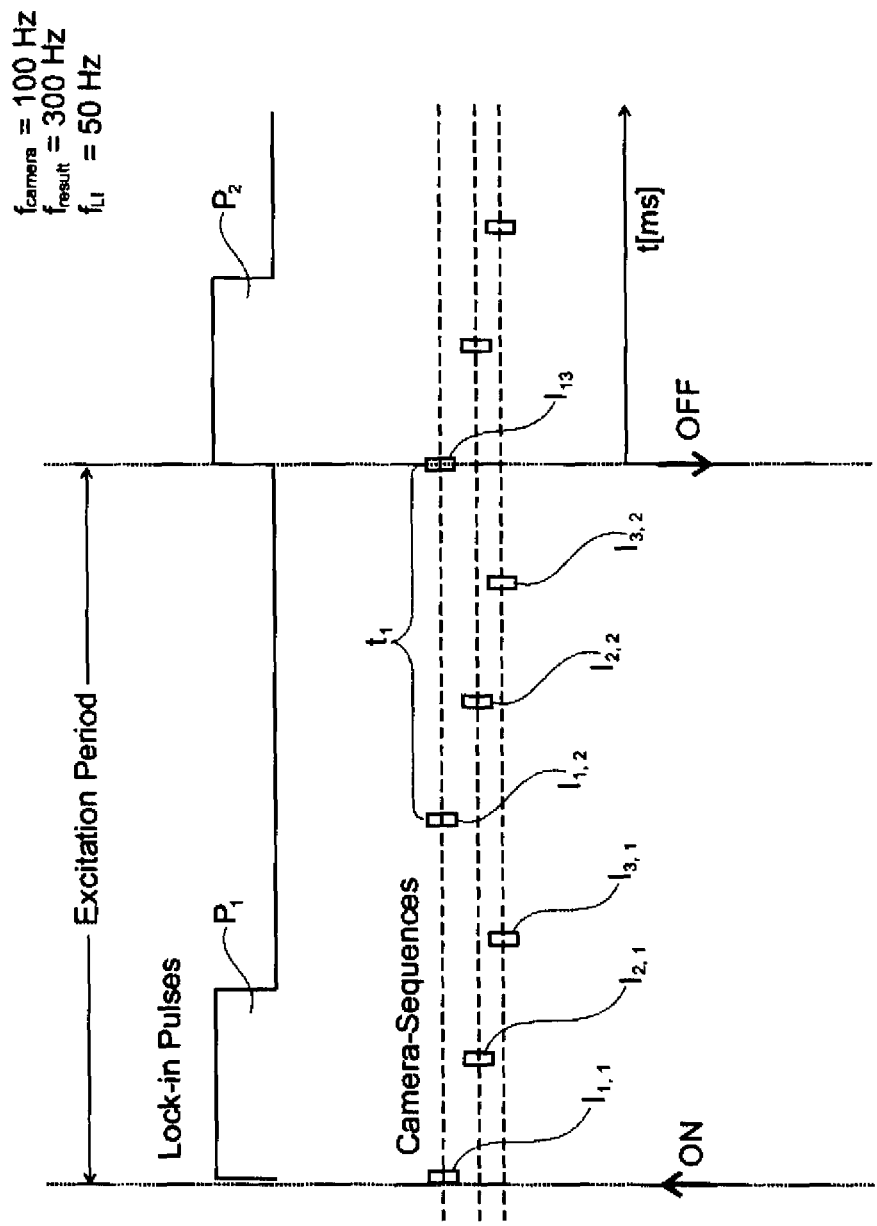

FIG. 12 schematically shows a block diagram of another embodiment of a system for implementing an embodiment of the method of the invention.

FIG. 1 shows a first example for an apparatus for carrying out lock-in thermography measurements. A sample 1 is formed out of two layers where an upper layer 2 is located on a base layer 3. An excitation source 4, which may be a laser source, a LED-device or an electro-magnetic excitation device, operated with the lock-in frequency is used as an excitation source 4 with which the sample 1 to be examined is excited. A camera 5 is directed to the sample 1 to take heat dependent images of the surface of the sample 1.

FIG. 2 shows a second example for an apparatus for carrying out lock-in thermography measurements In this case a sample 1 is a sample having a defect 11 which is, in this case, a pore containing gas/air. The sample 1 can be a metal sample, a semiconductor sample or a top surface of a construction component, like a metal piston having a high heat flow velocity. The sample 1 is heated up by a heating source (not shown) by energy pulses, for example light pulses of a LED field as indicated by the arrows H with a lock-in frequency. The energy is converted to heat at the surface of the sample. If heated in this way, the pore 11 is an obstacle to the heat flow in the sample starting from the surface 12 of the sample 1 and directed into the sample 1 from top to bottom in FIG. 2. The pore 11 is an obstacle to the heat flow because of the transition of the heat flow velocity from the sample 1 to the pore 11. At the pore 11, the heat flow is directed upwards (as viewed in FIG. 2) along the arrow P again and creates a hot spot 13 the shape of which reflects the shape of the pore 11 added the effect of dissipation of the heat sideways in the sample 1 as viewed in FIG. 2. The area 14 below the pore 11 (as viewed in FIG. 2) is in the "shadow" of the pore and, consequently heated up differently from the rest of the sample. An image of the hot spot 13 and the rest of the surface of the sample is captured along the line of the arrow P by a camera 15. The camera 15 produces an image 16 where the hot spot 13 produced by the pore 11 is clearly visible.

Since the instance in time when the hot spot 13 is created by the heat flow reflected from the pore 11 depends on the distance between the upper border of the pore 11 from the surface 12 of the sample 1, the image of the pore 13 appears in an image which is delayed with respect to the excitation pulse by twice the runtime of the heat flow between the pore 11 and the surface 12. Therefore, in the case of various defects like the pore 11 in different depths of the sample will appear in images at different time distances from the excitation pulse.

The method of the invention for a non-destructive, non-contacting and image forming examination of a sample by means of a heat flow thermography method where the examination consists of evaluating the presence of any gradients in heat flow velocity at respective depth distances from a surface of the sample comprises the following steps:
(1) exciting the sample by applying heat pulses to the sample with a lock-in frequency equal to or greater than one fourth of the imaging frequency of the camera for exciting the sample,
(2) capturing plural thermal image sequences of a thermal flow originating from the heat pulses by at least one infrared camera by capturing the plural image sequences during successive excitation periods of the heat pulses with the imaging frequency,
(3) implementing relative time delays Δt between a starting point of imaging of the respective image sequences and a starting point of the periodic excitation,
(4) combining all captured image sequences to a total image sequence in which all images are arranged in a correct time sequence,
(5) extracting from the total image sequence an indication of the existence and depth distance of a heat flow velocity transition from a surface of the sample.

According to the method of the invention, the periodic excitation of a sample is performed, which may be a work piece with defects or a layered material, where the starting point of the imaging of the respective image sequences is displaced with respect to the starting point of the periodic excitation. Alternatively, the starting point of the excitation with the lock-in frequency is displaced with respect to the starting point of the previous periodic excitation with the lock-in frequency. In both cases, the starting point of imaging of the respective image sequences is displaced (advanced or retarded) with respect to the starting point of the periodical excitation. Thereby, a high resolution analysis in space and in time of the pixel related intensity curves is made possible by means of the lock-in-correlation from which the characteristic values are extracted which describe the behavior in time of the heat waves through the sample.

FIG. 3 schematically shows the timing of the sequentially capturing of three image sequences which have a delay of Δt each to the previous image sequence with a lock-in frequency of 50 Hz. In this case, the time period between an on-signal ON and an off-signal OFF is the excitation period XP which, in this embodiment, is the same as the lock-in pulse period including lock-in pulse P1. During the excitation period XP, the camera takes, in a first sequence, images $I_{1,1}$ and $I_{1,2}$. Image $I_{1,3}$ is already outside of the excitation period XP. In a second image sequence, that is, the excitation pulse is repeated, the camera takes the images $I_{2,1}$ and $I_{2,2}$, and in the third image sequence, images $I_{3,1}$ and $I_{3,2}$ are taken so that, after compiling the three sequences, 6 images are available within two camera frames $t_1$ so that the total excitation period XP makes 20 ms. In this case, the stacking of the three image sequences results in a virtual camera frequency $f_{RESULT}$ of 300 Hz correlated to a lock-in frequency $f_{Li}$ of 50 Hz. Method according to claim 1, wherein the excitation periods of the heat pulses extend across at least one period of the lock-in frequency.

The image sequences can be captured by using a single camera and repeating the excitation pulses and for each repetition of excitation pulses shifting the starting point of the image capturing, or by using multiple cameras, each with a different delayed/advanced image capture time.

FIG. 4 schematically shows the timing of the capturing of three image sequences which have a delay of Δt each to the previous image sequence with a lock-in frequency of 60 Hz. In this case, the excitation period XP includes three periods of the lock-in pulses $P_1$, $P_2$ and $P_3$, and the excitation period XP lasts 50 ms during which 15 images $I_{1,1}$ to $I_{3,5}$ are recorded. Stacking of the three image sequences results in a virtual camera frequency of $f_{RESULT}$ of 300 Hz correlated to a lock-in frequency $f_{Li}$ of 60 Hz.

FIG. 5 schematically shows the timing of the capturing of five image sequences which have a delay of Δt each to the previous image sequence with a lock-in frequency of 100 Hz. In this case, the excitation period XP extends across two periods of lock-in pulses $P_1$ and $P_2$, and as a result of the stacking of five image sequences, there are 10 images within the two lock-in periods, i.e. within 20 ms. Stacking of five image sequences result in a virtual camera frequency $f_{RESULT}$ of 500 Hz correlated to a lock-in frequency $f_{Li}$ of 100 Hz.

In the embodiments of FIGS. 3 to 5, the camera frequency $f_{CAMERA}$ of 100 Hz is correlated to the lock-in frequency $f_{Li}$ of 100 Hz such that the beginning of each lock-in period and the beginning of the excitation pulse coincide with the first image being taken. Thereby, a fixed phase relationship between the starting point of the excitation and the points in time where the images are taken, is ensured. Thereby, the phase relationship between such excitation pulse, lock-in period and starting point of the imaging is fixed and images with repeating, fixed and equal phase values are to be found.

In this case, the phase values are well known and one returns to the coincidence of the excitation pulses and the first image of an image sequence after three lock-in periods LP1, LP2, and LP3. The imaging has to take place within three lock-in periods LP1, LP2, and LP3 whereby one obtains the above-mentioned 15 images within the three lock-in periods LP1, LP2, and LP3. In this way, the images of the three lock-in periods LP1, LP2, and LP3 may be combined to a virtual imaging period with a higher virtual image rate if one combines such three periods LP1, LP2, and LP3 having the constant phase displacement in between the individual lock-in periods LP1, LP2, and LP3.

FIG. 6 schematically shows the timing of the capturing of five image sequences which have a delay of Δt each to the previous image sequence with a lock-in frequency of 125 Hz. In this case, the excitation pulses P1 and P2 extend across two lock-in periods LP1, and LP2. Within the excitation period XP, 8 images are taken. Stacking of 5 image sequences results in a virtual imaging frequency of $f_{RESULT}$ of 500 Hz correlated with a lock-in frequency of 125 Hz.

FIG. 7 schematically shows the timing of the capturing of three image sequences which have a delay of Δt each to the previous image sequence with a lock-in frequency of 267 Hz. In this case, the lock-in pulses P1, P2 . . . PN have a lock-in frequency $f_{L1}$ of 267 Hz, i.e. a frequency which is not an integer multiple or an integer fraction (for example ½) of the camera frequency. In other words, one can select the lock-in frequency also without fixed relationship to the camera frequency and, resulting therefrom, the phase of the images in the image sequences. However, the phase location of the images $l_{1,1}$ to $l_{3,3}$ has to be arranged such that at least one image is taken during one lock-in period, and the phases of the images are considered when compiling the image sequences. Again, the requirement for the compiling of the image sequences is that at the beginning of an imaging sequence, the point of time when the first image of an image sequence is taken and the raising edge of the first excitation pulse and the beginning of the Lock-in (rising edge of the excitation control pulse CP or the ON-pulse) are synchronized to be in coincidence with each other. Since the phase values of the images the first image of an image sequence are known the image sequences can be processed and stacked as in the cases of FIGS. 3 to 5 when compiling the resulting image sequence.

In the embodiment of FIG. 7, the Lock-in period is controlled by a trigger pulse provided by the control circuit which trigger pulse enables the excitation pulses on the raising edge of the trigger pulse and in the excitation period XP, i.e. the measurement period, and the falling edge of the trigger pulse. This is an alternative to using the control signals "ON" and "OFF" as also shown in the previous figures.

FIG. 7 also shows the time delays Δt1, Δt2 and Δt3 which are implemented between the first second and third camera sequence. In case such time delays Δt1, Δt2 and Δt3 do not have the same value, the differing values have to be taken into account when compiling the image sequences. The same is true for the embodiments shown in FIGS. 3 to 6.

To summarize, the evaluation can be done by imaging which has high solution in time as well as in space and is scalable with respect to both parameters. By evaluating the image sequences in the manor described above, one can not only verify the existence of the any pores or layer structures in the sample but also the depths location of the respective defects or transitions by correlating the time delay of their respective images from the excitation.

A system for a non-destructive, non-contacting and image forming examination of the sample the system comprises a control circuit configured to excite the sample by applying heat pulses to the sample with a lock-in frequency greater than one fourth of the camera frequency for exciting the sample or work piece, to control excitation periods of the heat pulses to start and stop, respectively, the excitation of the sample by means of the heat pulses, and to capture thermal image sequences by capturing the plural image sequences during excitation periods of the heat pulses with the imaging frequency of the camera.

FIG. 8 shows a block diagram of an embodiment of a system for implementing an embodiment of the method of the invention. The control circuit of the system comprises a pulse generator 20 outputting a signal with the lock-in frequency to a frequency converter and shift circuit 22 connected to the camera 15 to convert the lock-in frequency to the camera frequency and shift the camera signal by the time delays Δt1, Δt2, and Δt3 for the image sequences. The output of the pulse generator 20 is transmitted to an excitation source 24 which serves to transmit the excitation pulses to the sample 10. The control circuit of FIG. 7 is preferred for the embodiment with a timing of the image capturing according to the FIGS. 3 to 6 where the imaging sequences of the camera are shifted in phase with respect to the Lock-in frequency.

FIG. 9 shows a block diagram of another embodiment of a system for implementing an embodiment of the method of the invention. The control circuit of the system comprises a pulse generator 30 outputting a signal with the lock-in frequency to a frequency converter 32 connected to the camera 15 to convert the lock-in frequency to the camera frequency, and shift circuit 34 connected to the pulse generator 30 and configured to shift the lock-in pulses by the time delays Δt1, Δt2, and Δt3 for shifting the image sequences. The shifted excitation signal is supplied from an excitation source 36 to the sample 10. In this case, the pulse generator 30 is the master circuit for providing the clock to the system.

FIG. 10 shows a block diagram of another embodiment of a system for implementing an embodiment of the method of the invention. The control circuit of the system comprises a frequency converter 40 connected to the camera 15 configured to convert the camera frequency to the lock-in frequency, and a shift circuit 42 connected to the frequency converter 40 and configured to shift the lock-in pulses by the time delays $\Delta t1$, $\Delta t2$, and $\Delta t3$ for the image sequences. In this case, the camera 15 is the master circuit for providing the clock signal to the control circuit.

The control circuit according to FIG. 10 is preferred as the camera master circuit for providing the clock and, therefore, the beginning of an imaging sequence, the point of time when the first image of an image sequence is taken and the raising edge of the first excitation pulse and the beginning of the lock-in period are easily synchronized to be in coincidence with each other.

FIG. 11 shows a block diagram of another embodiment of a system for implementing an embodiment of the method of the invention. The control circuit of the system comprises a frequency converter 50 connected to the camera 15 configured to convert the camera frequency to the lock-in frequency, a synchronization circuit 52 for synchronizing the signal output from the frequency converter 50 with a signal of a pulse generator 54, and a shift circuit 56 connected to the pulse generator 54 and configured to shift the lock-in pulses by the time delays $\Delta t1$, $\Delta t2$, and $\Delta t3$ for the image sequences. Also in this case, the camera 15 is the master circuit for providing the clock signal to the control circuit. The synchronization circuit 52 provides the required synchronization in this control circuit. The excitation circuit 58 provides the excitation pulses to the sample 10.

In FIG. 11 the synchronizing circuit is also used to synchronize the beginning of an imaging sequence, the point of time when the first image of an image sequence is taken and the raising edge of the first lock-in pulse and the beginning of the excitation period XP to be in coincidence with each other as required for obtaining images in equal time distances after stacking of the image sequences.

FIG. 12 shows a block diagram of another embodiment of a system for implementing an embodiment of the method of the invention. The control circuit of the system comprises a frequency converter 50 connected to the camera 15 configured to convert the camera frequency to the lock-in frequency, a synchronization circuit 52 for synchronizing the signal output from the frequency converter 50 with a signal of a pulse generator 54, and a shift circuit 56 connected to the pulse generator 54 and configured to shift the lock-in pulses by the time delays $\Delta t1$, $\Delta t2$, and $\Delta t3$ for the image sequences. Also in this case, the camera 15 is the master circuit for providing the clock signal to the control circuit. The synchronization circuit 52 provides the required synchronization in this control circuit. The excitation circuit 58 provides the excitation pulses to the sample 10.

In FIG. 12 the synchronizing circuit is also used to synchronize the beginning of an imaging sequence, the point of time when the first image of an image sequence is taken and the raising edge of the first lock-in pulse and the beginning of the excitation period XP to be in coincidence with each other as required for obtaining images in equal time distances after stacking of the image sequences.

According to disclosed embodiments, a method for generating high frequency image sequence from a camera is provided, comprising: applying a first set of plurality of excitation pulses to a sample, the excitation pulses having frequency f1; taking a first set of plurality of images of the sample at a frequency f2, wherein the timing of the first set of plurality of images has a first relative time delay $\Delta t_1$, between a starting point of the first set of plurality of images and a starting point of the first set of plurality of excitation pulses; applying a second set of plurality of excitation pulses to a sample, the excitation pulses having frequency f1; taking a second set of plurality of images of the sample at a frequency f2, wherein the timing of the second set of plurality of images has a second relative time delay $\Delta t_2$ between a starting point of the second set of plurality of images and a starting point of the second set of plurality of excitation pulses, and wherein the second relative time delay is different from the first relative time delay; and, combining the first and second sets of plurality of images such that at least one image from the second set of plurality of images is inserted between each two images of the first set of plurality of images. One of the relative time delays may be set to zero, i.e., such that the first image coincides with the first excitation pulse. Further sets can be generated, such that a third, fourth, fifth, etc., sets of excitation pulses can be applied to the sample, while corresponding sets of images with different time delays can be taken of the sample. All of the sets can be combined to generate one sequence. In one case, at least one image from each of the image sets 2-n is inserted between every two images from the first set. The sequence of images is examined to determine the samples' response to the excitation pulses. For example, the sequence can be used to determine the depth of a defect within the sample.

According to another embodiment, a method for generating high frequency image sequence from a camera capable of operating at a camera frequency fc is provided, comprising: i. repeatedly exiting a sample at an excitation frequency $f_E$; ii. setting a starting point with respect to the excitation frequency $f_E$ and operating the camera to image the sample at the camera frequency $f_C$, to thereby generate a first sequence of images; iii. shifting the starting point with respect to the excitation frequency $f_E$ and operating the camera to image the sample at the camera frequency $f_C$, to thereby generate a second sequence of images; iv. combining the first sequence of images and the second sequence of images to generate a total sequence, wherein at least one image from the second sequence is positioned in time between two images of the first sequence. The method can proceed by repeating step iii a number of n times, and at step iv combining all of the sequences. In such a case, the method may include at least one images from each of the n sequences inserted between each two images of the first sequence. In the above methods the excitation frequency $f_E$ is higher than the camera frequency $f_C$. In some embodiments the excitation frequency $f_E$ is higher than one fourth of the camera frequency $f_C$.

According to another embodiment, a method for generating high frequency image sequence from a plurality of cameras, each capable of operating at a camera frequency $f_C$ is provided, comprising: i. repeatedly exciting a sample at an excitation frequency $f_E$, which is higher than the camera frequency $f_C$; ii. setting a plurality of starting point, each starting point designated for a corresponding one of the plurality of cameras, each starting point being shifted in time from the other starting points; iii. operating the plurality of cameras, each according to its corresponding starting point, so as to image the sample at the camera frequency $f_C$, and to thereby generate a plurality sequence of images, one sequence from each camera and each sequence being shifted in time from the other sequences; and, iv. combining the plurality of sequences of images to generate a total sequence.

It is apparent from the above specification that the invention is not restricted to the application in the two cases which have been disclosed as examples. Rather, the method of the invention is applicable in all cases where the speed (frames per second) of the camera is insufficient to produce the image sequences required for locating the existence and/or the depths location of any heat flow velocity transitions, such as border surfaces between layers of different flow velocity characteristics in a layered structure or defects like holes, pores and cuts in a sample or a work piece, for example a piston for a vehicle motor, on the basis of one single image sequence.

LIST OF REFERENCE SIGNS 1 sample
2 upper layer
3 base layer
4 excitation source
5 camera
10 test sample
11 defect/pore
11 synchronization unit
12 surface
13 hot spot
14 area under defect
15 camera
16 image of sample
20 pulse generator
22 frequency converter
24 excitation
30 pulse generator
32 frequency converter
34 Δt-shift
36 excitation
40 frequency converter
42 Δt-shift
44 excitation
50 frequency converter
52 synchronization
54 pulse generator
56 Δt-shift
58 excitation
P excitation pulse
XP excitation period
LP lock-in period
$f_{LOCK-IN}$ lock-in frequency
$f_{RESULT}$ resulting frequency
$f_{CAMERA}$ camera frequency
Δt1, Δt2, and Δt3 time delays

The invention claimed is:

1. A method for a non-destructive, non-contacting and image forming examination of a sample by means of a lock-in heat flow thermography method where the examination consists of evaluating the presence of any gradients in heat flow velocity at respective depth distances from a surface of the sample, comprising:
generating a series of lock-in pulses;
applying the lock-in pulses to an excitation source and exciting the sample by means of periodic square-wave heat pulses (Pi) from the excitation source wherein the periodic heat pulses are locked-in to the lock-in pulses at a lock-in frequency;
synchronizing the lock-in pulses to a camera frequency and applying the camera frequency to an infrared camera such that a raising edge of a first lock-in pulse of the applied lock-in pulses is coincident with a first image of a plurality of thermal image sequences, thereby capturing the plurality of thermal image sequences, each thermal image sequence comprising a plurality of images of a surface;
generating multiple image sequences, each with a different relative time delay between a starting point of imaging of the respective image sequences and the lock-in pulses, and wherein one or more of the multiple image sequences are generated using a frequency relationship between the lock-in frequency and the camera frequency that is not an integer multiple or an integer fraction;
compiling the multiple image sequences such that images from the multiple image sequences are interleavedly arranged into a correct time sequence defining a virtual imaging frequency larger than the camera frequency and the lock-in frequency, wherein the compiling includes considering the different relative time delays of the multiple image sequences that are generated using the frequency relationship between the lock-in frequency and the camera frequency that is not the integer multiple or the integer fraction;
extracting from the combined image sequence a phase shift relative to the lock-in pulses, forming an indication of the existence and depth distance of a heat flow velocity transition from a surface of the sample, and
wherein exciting the sample comprises applying heat pulses to the sample with the lock-in pulses at the lock-in frequency, controlling an excitation period of the heat pulses during which the excitation of the sample by means of the heat pulses takes place, and capturing thermal image sequences by capturing the plural image sequences during successive excitation periods of the heat pulses with the imaging frequency locked in to the lock-in pulses.

2. The method according to claim 1, wherein the lock-in frequency is higher than the imaging frequency of the camera or wherein the lock-in frequency is higher than one fourth the camera frequency.

3. The method according to claim 1, wherein the excitation periods of the excitation pulses extend across at least one period of the lock-in frequency.

4. The method according to claim 1, wherein off-periods of the excitation pulses between excitation periods extend up to a point of time when an equilibrium condition is reached with respect to the dissipation of the heat applied during the excitation of the sample.

5. The method according to claim 1, wherein the total image sequence is corrected such that the pixel related intensity curves comprise a strictly monotone behavior in the areas to be evaluated.

6. The method according to claim 1, wherein a time delay Δt1 between a first image sequence and a second image sequence has a different value than a time delay Δt2 between the second image sequence and a third image sequence.

7. The method according to claim 1, wherein the image intensity of each captured image sequence is corrected so that all captured image sequences have the same intensity offset.

8. The method according to claim 1, wherein the lock-in frequency of the excitation pulses and the imaging frequency of the camera are synchronized to commence with the starting point in time of the excitation periods.

9. A system for a non-destructive and image forming examination of a sample by means of a heat flow thermography method where the examination consists of evaluating the presence of any gradients in heat flow velocity at respective depth distances from a surface of the sample, comprising:
an excitation source for exciting the sample by means of periodic square-wave heat pulses from at least one excitation source,
at least one infrared camera for capturing thermal image sequences of a thermal flow originating from the heat pulses,
a pulse generator generating lock-in pulses,
a frequency converter receiving the lock-in pulses at a lock-in frequency and generating a camera frequency,
a control circuit configured:
to control the timing of capturing the thermal images by the camera, according to the camera frequency of the frequency converter, to thereby generate a plurality of thermal image sequences, each sequence comprising a plurality of thermal images, wherein the timing of capturing the thermal images by the camera uses two or more frequency relationships between the lock-in frequency and the camera frequency that are not an integer multiple or an integer fraction, and
to combine all captured image sequences from the plurality of thermal image sequences to form a total image sequence in which all images are interleavedly arranged in a correct time sequence defining a virtual imaging frequency larger than the camera frequency and the lock-in frequency, wherein the combining accounts for the different relative time delays of the multiple image sequences, including the two or more frequency relationships between the lock-in frequency and the camera frequency that are not an integer multiple or an integer fraction, and
to extract from the total image sequence an indication of the depth distance of a heat flow velocity transition from a surface of the sample by extracting a phase shift from the total image sequence, and
to evaluate the thermal images by means of a signal and image processing and depicting a thermal flow with a resolution in time and in space,
wherein the control circuit is further configured:
to excite the sample by applying heat pulses to the sample with a lock-in frequency that is higher than one fourth the camera frequency,
to control an excitation period of the heat pulses during which the excitation of the sample by means of the heat pulses takes place,
to implement different relative time delays between a starting point of imaging of the respective image sequences and a starting point of the periodic excitation such that a raising edge of the starting point of the periodic excitation is coincident with a first image of the image sequences, and
to capture thermal image sequences by capturing the plural image sequences during successive excitation periods of the heat pulses with the imaging frequency.

10. The system of claim 9, wherein the control circuit comprises:
a shift circuit connected to the camera to shift the camera signal by the time delays $\Delta t1, \ldots, \Delta tn$ for the corresponding image sequences, wherein at least one of the time delays has a different value than another one of the time delays.

11. The method of claim 1, wherein a phase location of images in each of the multiple image sequences is arranged such that at least one image in each of the multiple image sequences is taken during a single lock-in period.

12. The system of claim 9, wherein a phase location of images in each of the multiple image sequences is arranged such that at least one image in each of the multiple image sequences is taken during a single lock-in period.

* * * * *